Figure 1A:
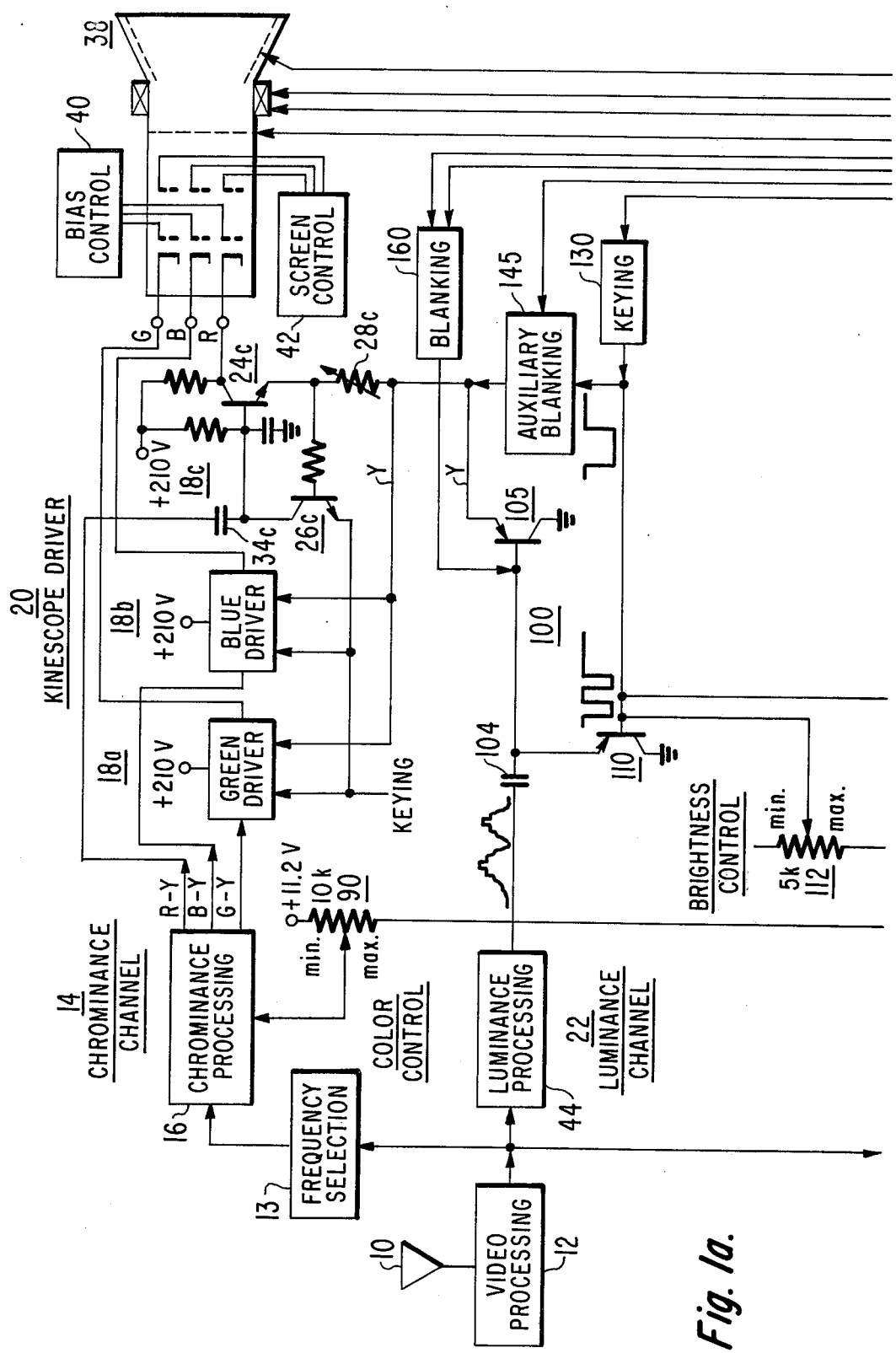

United States Patent [19]

Shanley, II

[11] 4,118,729

[45] Oct. 3, 1978

[54] SET-UP ARRANGEMENT FOR A COLOR TELEVISION RECEIVER

[75] Inventor: Robert Loren Shanley, II, Indianapolis, Ind.

[73] Assignee: RCA Corporation, New York, N.Y.

[21] Appl. No.: 764,065

[22] Filed: Jan. 31, 1977

[51] Int. Cl.² .............................................. H04N 9/62
[52] U.S. Cl. ........................................ 358/10; 358/29
[58] Field of Search ......................... 358/10, 21, 29, 65

[56] References Cited

U.S. PATENT DOCUMENTS

| 3,419,673 | 12/1968 | Swaine | 358/10 |
| 3,497,609 | 2/1970 | Krug | 358/10 |
| 3,959,811 | 5/1976 | Shanley | 358/10 |

OTHER PUBLICATIONS

Kiver et al., *Television Simplified*, 7th Ed., Van Nostrand Reinhold Co., pp. 521, 522, 1973.

*Primary Examiner*—John C. Martin
*Attorney, Agent, or Firm*—Eugene M. Whitacre; William H. Meagher; Ronald H. Kurdyla

[57] ABSTRACT

A service switch to permit set-up adjustment of a color image reproducing kinescope in a color television receiver. The receiver comprises a horizontal deflection circuit for providing a periodic horizontal deflection signal having a frequency synchronized by a sync signal derived from a composite color video signal, and means for deriving a receiver operating voltage from the periodic signal of a magnitude dependent upon the frequency of the periodic signal. The switch has "normal" and "service" positions, and is coupled to respective direct voltage control terminals of luminance and chrominance channels and a vertical deflection circuit of the receiver. In the "service" position, the switch renders the luminance and chrominance channels inoperative to couple signals, and vertical scanning is disabled, to permit set-up adjustment of the kinescope. The sync signal is derived independent of the condition of the chrominance and luminance channels, and is coupled to the horizontal deflection circuit independent of the position of the switch, so that the derived voltage exhibits substantially the same magnitude in both "normal" and "service" positions.

12 Claims, 3 Drawing Figures

SET-UP ARRANGEMENT FOR A COLOR TELEVISION RECEIVER

The present invention relates to color television receivers and, in particular, to apparatus for facilitating the set-up and servicing of a color kinescope included in such receivers.

Set-up of a color kinescope entails color temperature adjustments among a number of other adjustments. The color temperature adjustment takes into account the differences of the cathode emissions of the several electron beam producing guns of the kinescope and the differences in the efficiencies of the several phosphors of the kinescope. The color temperature adjustment typically involves adjusting direct control voltages applied between cathodes and grids of the kinescope and the AC gain of the kinescope drivers such that white information is reproduced with the proper color temperature at all brightness levels between minimum and maximum white, with the maximum white level being produced at the highest achievable level of brightness consistent with good image clarity.

Service switch arrangements included in color television receivers are known which provide a convenient means for factory and service personnel to make adjustments without the need for additional equipment. Typically, service switch arrangements provide "normal" and "service" positions. When the service switch arrangement is in the "normal" position, the receiver operates to couple video signals to the kinescope for normal image viewing.

When the service switch is in the "service" position, the vertical deflection circuits are disabled and the chrominance and luminance signals are decoupled from the kinescope so that the kinescope is in a quiescent operating condition. The direct control signals coupled to the grids (or cathodes) of each gun are gradually controlled until that gun produces a barely visible, narrow horizontal line on the kinescope. When all three guns have been so energized, the line will appear, from a suitable distance, as a white line of low brightness level.

Various service switch arrangements are described in the following U.S. patents assigned to the same assignee as the present invention: U.S. Pat. No. 3,114,796 (J. Stark, Jr. et al.); U.S. Pat. No. 3,270,125 (G. E. Kelly et al.); U.S. Pat. No. 3,461,225 (P. E. Crookshanks et al.); U.S. Pat. No. 3,525,801 (D. H. Willis); U.S. Pat. No. 3,820,155 (D. L. Neal); and U.S. Pat. No. 3,959,811 (R. L. Shanley, II).

When one or more unregulated or partially regulated operating voltages for a color television receiver are derived from horizontal output circuitry of a horizontal deflection stage of the receiver, particular problems are encountered in providing an accurate set-up adjustment. Typically, such voltages are ultimately derived from the oscillatory output signal of a horizontal oscillator included in the horizontal deflection stage. The magnitudes of such voltages are determined in part by the frequency of oscillation of the horizontal oscillator, which in turn is stabilized by a synchronizing (sync) signal derived from a received composite video signal. In the absence of the sync signal, the oscillator frequency is not stabilized and tends to vary, thereby producing variations in the derived receiver operating potentials.

In the service or adjustment mode of operation of such a color television receiver system, it is desirable to provide accurately simulated quiescent operating conditions in order to facilitate accurate set-up of the color receiver. Furthermore, it is desirable that the service switch control the various portions of the receiver with which it is coupled by direct (DC) control signal connections rather than by alternating (AC) control signal connections to minimize stray signal pick-up and other problems associated with long leads coupling alternating signals.

An additional problem is encountered in the design of "service" set-up arrangements for color temperature adjustment of receivers of the type including an auxiliary (reserve) blanking circuit. One such circuit, which serves to inhibit kinescope operation during the vertical retrace-horizontal trace interval to thereby inhibit the formation of disconcerting horizontal trace lines, is described in U.S. Pat. No. 3,984,864 granted to D. H. Willis and assigned to the same assignee as the present invention. When using such an arrangement, provision should be made to insure that such auxiliary blanking does not adversely affect the set-up procedure.

In accordance with the present invention, a control arrangement is provided in a system for processing a composite color video signal containing chrominance, luminance and synchronizing signal components. The system includes chrominance and luminance channels for processing the chrominance and luminance components, a color image reproducing device having plural color producing electron beam apparatus responsive to chrominance and luminance signals coupled via the chrominance and luminance channels, and a deflection circuit associated with the electron beam apparatus for providing horizontal and vertical scanning of the reproducing device. The deflection circuit includes means for providing a periodic signal having time intervals representative of image trace and retrace intervals and a frequency synchronized by a sychronizing input signal applied thereto. A receiver operating supply voltage of a magnitude dependent upon the frequency of the periodic signal is derived from the periodic signal. A switch coupled to a direct voltage control terminal of each of the chrominance and luminance channels and the deflection circuit is also included. A first position of the switch renders the chrominance and luminance channels and the deflection circuit normally operative in a normal mode of operation of the system. A second position of the switch renders the chrominance and luminance channels inoperative to couple the chrominance and luminance components, and renders the deflection circuit inoperative to provide scanning of the image reproducing device in one direction, thereby permitting adjustment of the device in a service mode of operation. A signal separator operative independent of the chrominance and luminance channels serves to separate the synchronizing component from the composite video signal. A coupling circuit supplies the separated synchronizing component to the periodic signal deriving means as the synchronizing signal input independent of the position of the switch, whereby the derived receiver operating supply voltage exhibits substantially the same magnitude during both the normal and service modes.

Figure 1B:
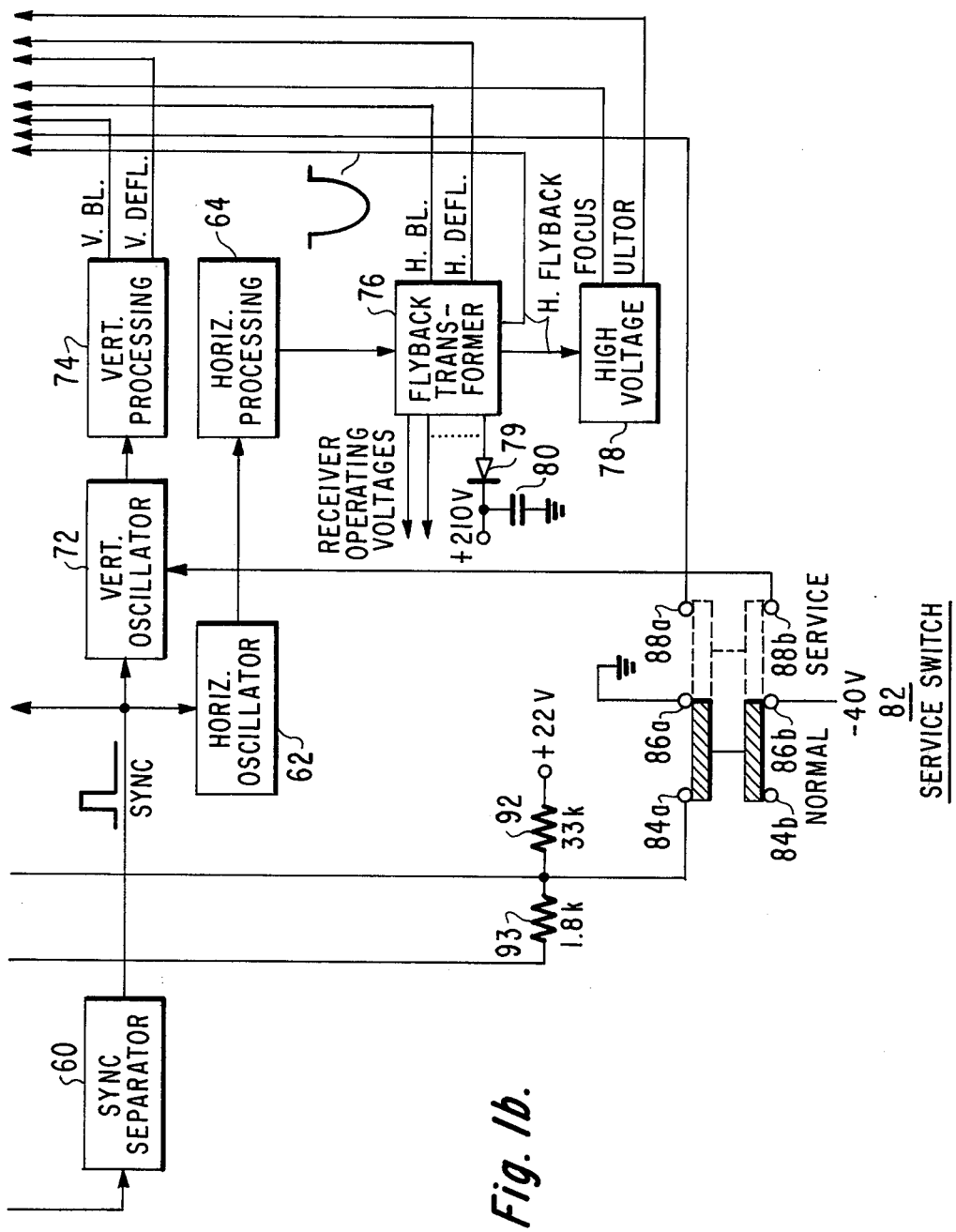
Figure 2:
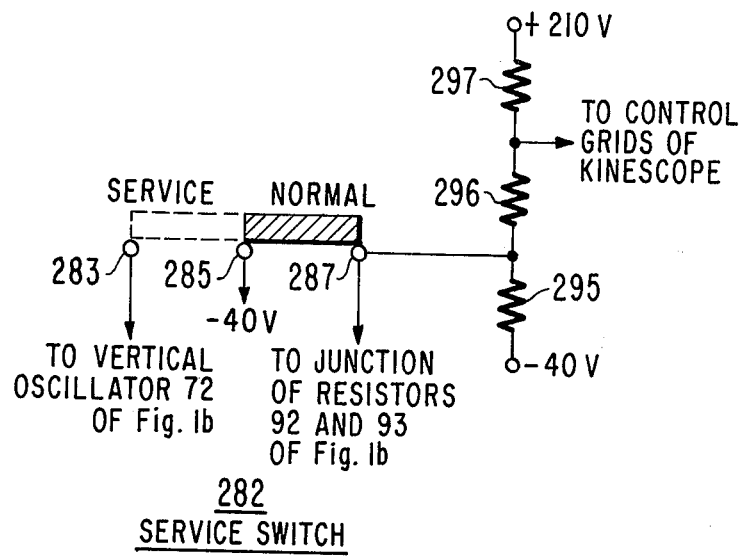

In the drawing:

FIGS. 1a and 1b show, partially in block diagram form and partially in schematic circuit diagram form, the general arrangement of a color television receiver employing an apparatus constructed in accordance with the present invention; and FIG. 2 shows a modification of the apparatus shown in FIGS. 1a and 1b;

In the following description it will be helpful to concurrently refer to FIGS. 1a and 1b which are parts of the same arrangement.

In FIGS. 1a and 1b, there is shown a color television receiver including a video processing unit 12 for receiving from an antenna 10 radio frequency (RF) signals and for translating these signals through an intermediate frequency (IF) amplifying and detecting portion (not shown) to form a composite video signal. The composite video signal comprises chrominance, luminance and synchronizing signal components.

A frequency selection unit 13 selectively couples the chrominance component to a chrominance channel 14, including a chrominance processing unit 16 for processing the chrominance component to derive R−Y, B−Y and G−Y color difference signals. A viewer adjustable color control potentiometer 90 serves to adjust the signal gain of chrominance unit 16 and thereby the amplitude of signals processed by unit 16. The color difference signals are coupled to respective inputs of kinescope driver stages 18a, 18b and 18c of a kinescope driver 20. The kinescope driver stages combine the R−Y, B−Y and G−Y color difference signals with a luminance output signal, Y, of a luminance channel 22 to derive R, B and G color signals.

The R, B and G color signals are respectively applied to cathodes of the three electron guns of kinescope 38. Each gun, for example, comprises a cathode, a control grid and a screen grid to develop and accelerate an electron beam. Focus and ultor electrodes are also provided. Direct bias control voltages are coupled to the control grids from a bias control unit 40, and direct screen control voltages are coupled to the screen grids from screen control unit 42 to permit adjustment of the cut-off point of each gun.

The illustrated kinescope driver stages 18a, 18b and 18c are of the type described in U.S. Pat. No. 3,970,895 granted to D. H. Willis and assigned to the same assignee as the present invention. Since stages 18a, 18b and 18c are similar, the following brief description of stage 18c applies to stages 18a and 18b as well.

Stage 18c comprises an NPN amplifier transistor 24c and an NPN keyed clamping transistor 26c arranged in feedback relation as shown. A +210 volt source provides an operating voltage for stage 18c. The R−Y color difference signal is coupled to a base electrode of transistor 24c through a coupling capacitor 34c, the luminance output signal Y from luminance channel 22 is coupled to an emitter electrode of transistor 24c via a variable drive control resistor 28c, and periodic keying signals are applied to an emitter electrode of transistor 26c from a keying stage 130. Luminance and keying signals are similarly applied to corresponding inputs of driver stages 18a and 18b.

Transistor 24c serves to combine and amplify the Y and R−Y signals to derive the color signal R at the collector output of transistor 24c. Variable resistor 28c is adjustable to control the gain of stage 18c. Capacitor 34c and transistor 26c form a keyed clamping circuit for maintaining the voltage developed at the emitter of transistor 24c substantially constant and independent of the direct current conditions of chrominance processing unit 16 and the base-to-emitter voltage variations of transistor 24c. The clamping action occurs when transistor 26c is rendered conductive in response to a keying pulse generated by keying circuit 130 during the horizontal flyback (retrace) interval.

The output of video processing unit 12 is also coupled to a sync separator 60 for deriving positive periodic line sync pulses from the video signal independent of the operation of the chrominance and luminance channels. The derived sync pulses are in phase with and correspond to the sync component of the video signal, and are coupled to a horizontal deflection stage including a horizontal oscillator 62 and horizontal signal processing circuits 64, and to a vertical deflection stage including a vertical oscillator 72 and vertical signal processing circuits 74.

Periodic vertical deflection and vertical blanking signals provided by vertical signal processing unit 74 are coupled to vertical deflection windings of kinescope 38 and to luminance channel 22, respectively. Output signals from horizontal signal processing unit 64 are applied to a horizontal flyback transformer 76 to derive horizontal blanking, horizontal deflection and horizontal flyback signals. The horizontal deflection signals are coupled to horizontal deflection windings of kinescope 38, and the horizontal blanking signals are coupled to luminance channel 22.

Positive horizontal flyback signals occuring during the horizontal sync or retrace interval of the video signal are coupled to a high voltage unit (e.g., voltage tripler) 78, which provides high operating voltages for the ultor and focus electrodes of kinescope 38, and to keying circuit 130 of luminance channel 22.

Keying circuit 130 generates negative-going periodic keying signals during the horizontal retrace interval in response to and substantially coincident with negative-going horizontal flyback signals. The keying signals control the operation of the keyed bias transistors (e.g., 26c) of the kinescope driver stages during the horizontal retrace interval as described in U.S. Pat. No. 3,970,895.

The horizontal flyback transformer 76 also provides voltages from which rectified unregulated, DC receiver operating voltages are developed. In this example, the unregulated operating voltage supply (+210 volts) for the kinescope driver stages is developed from a voltage produced by a tapped secondary winding of horizontal flyback transformer 76.

Luminance channel 22 includes a luminance signal processing unit 44 for amplifying and otherwise processing the luminance component of the composite video signal to provide a "sync tips positive" luminance output signal in this example. The luminance component from unit 44 comprises periodic blanking pulses and signal portions representing image information disposed between the blanking pulses. The blanking pulses are formed by a pedestal level upon which are imposed sync pulses.

The luminance component from the output of unit 44 is coupled to a keyed blanking level clamp circuit comprising a coupling capacitor 104 and a PNP clamp transistor 110. Periodic keying signals from keying unit 130 are combined with sync signals from sync separator 60 at a base electrode of transistor 110 to form a switching signal for controlling the clamping (conduction) intervals of clamp transistor 110. Clamp transistor 110 conducts periodically to clamp the luminance signal in response to the minimum amplitude level of the switching signal. When clamp transistor 110 conducts, the luminance signal coupled via capacitor 104 is clamped to a voltage then appearing on the base of transistor 110.

This voltage represents a blanking reference level corresponding to a black tone of an image.

Positive periodic horizontal and vertical blanking pulses, with time durations respectively corresponding to horizontal and vertical retrace intervals, are combined and amplitude limited by a blanking unit 160. The combined blanking signals are coupled to a base electrode of a PNP luminance amplifier transistor 105 where the combined blanking signal is summed with the clamped luminance signal to insure that kinescope 38 is substantially cut-off during the horizontal and vertical retrace intervals. Transistor 105 provides an amplified, clamped luminance signal Y to kinescope driver stages 18a, 18b and 18c.

The output of keying unit 130 is also coupled to an auxiliary blanking unit 145 to provide an auxiliary or reserve periodic blanking pulse during each vertical retrace-horizontal trace interval to insure that kinescope 38 is cut-off, so that disconcerting horizontal trace lines are not visible during this interval. Keying unit 130 and auxilary blanking unit 145 can be of the type described in aforementioned U.S. Pat. No. 3,984,864 of D. H. Willis.

Additional control of clamp transistor 110 is accomplished by a brightness control variable resistor 112. Variable resistor 112 represents a manually adjustable, viewer operated control to vary the conduction of clamp transistor 110 and to thereby obtain a desired level of image brightness. Briefly, variable resistor 112 serves to adjust the bias and therefore the level of conduction and clamping voltage of keyed clamp transistor 110. Adjustment of resistor 112 between the minimum (MIN) and maximum (MAX) positions varies the blanking (or black) level of the luminance signal, and thereby image brightness from a minimum to a maximum level. The brightness control function (including the circuit portion designated generally as 100) is described in greater detail in co-pending U.S. patent application, Ser. No. 715,851, entitled "Brightness Control Apparatus", filed Aug. 19, 1976, in the name of M. N. Norman and assigned to the same assignee as the present invention.

A two-position service switch 82 having two sets of electrically isolated poles and "normal" and "service" positions facilitates initial adjustment of receiver operating conditions. The receiver operates normally in the "normal" position. When in the "service" position, service switch 82 permits color temperature adjustments of kinescope 38.

A first set of poles includes poles 84a, 86a and 88a. Pole 84a is directly connected to a lower terminal of brightness control resistor 112, to a lower terminal of color control potentiometer 90 via a resistor 93, and to a source of positive direct voltage (+22 volts) via a resistor 92. Pole 86a is connected to a point of reference potential (e.g., ground), and pole 88a is connected to a control input of auxiliary blanking unit 145. A second set of poles includes poles 84b, 86b and 88b. No connection is made to pole 84b in this example. Pole 86b is connected to a source of negative direct voltage (−40 volts), and pole 88b is connected to a control input of vertical oscillator 72.

In the "normal" position, poles 84a and 86a are connected together via a negligible impedance so that pole 84a and therefore the junction of resistors 92 and 93 are at ground potential. Color control potentiometer 90 and brightness control resistor 112 operate in normal fashion, and chrominance and luminance signals are processed normally by the chrominance and luminance channels, as discussed earlier.

In the "service" position, poles 86b and 88b are connected together through a negligible impedance, so that a negative voltage (−40 volts) appears at pole 88b and is coupled to the control input of vertical oscillator 72. This negative voltage serves to inhibit the operation of vertical oscillator 72 and thereby vertical scanning of kinescope 38. The displayed image consequently is vertically collapsed to a narrow horizontal line in the center of the display screen of the kinescope.

In addition, in the "service" position, pole 84a is decoupled from ground potential, and the voltage appearing at the junction of resistors 92 and 93 increases. The direct voltage then developed across color control potentiometer 90 and therefore the voltage appearing at the wiper of potentiometer 90 increases to a level greater than +11.2 volts due to the voltage divider action of the +11.2 volt and +22 volt sources, resistors 92 and 93, and the resistance of potentiometer 90. This increased, positive direct voltage is in a direction to reduce the gain of (i.e., bias off) chrominance processing unit 16 so that substantially no chrominance signals are coupled through chrominance processing unit 16, and chrominance signals are removed from the chrominance channel.

A positive direct voltage also appears across brightness control resistor 112 as a result of the voltage divider action of resistor 112, resistor 92 and the +22 volt source. An increased positive voltage then appearing at the wiper of variable resistor 112 serves to raise the base voltage of clamp transistor 110 to a more positive level, corresponding to a "blacker-than-black" blanking reference level. A corresponding increased positive voltage consequently appearing at the junction of capacitor 104 and the emitter of transistor 110 during the clamping conduction intervals serves to reverse bias luminance amplifier transistor 105. Luminance signals are insufficient to forward-bias transistor 105 into conduction during this time, and substantially no current flows in the emitter of transistor 105.

Since the luminance and chrominance channels are rendered inoperative to couple luminance and chrominance signal components to kinescope 38 in the "service" mode, the amplifier transistors (e.g., 24c) of the kinescope driver stages are caused to provide quiescent direct voltages to respective cathodes of kinescope 38 approximately equal to that provided by a lack of luminance and chrominance signals. In this condition, color temperature adjustments of kinescope 38 can be accomplished by adjusting the fixed voltages applied to kinescope 38 from screen control unit 42 such that the separate guns are on the threshold between conduction and cut-off.

It is further noted that in the "service" position poles 86a and 88a are connected together through a negligible impedance so that pole 88a is at ground potential. The ground potential appearing at pole 88a and coupled to the control input of auxiliary blanking unit 145 serves to inhibit the operation of unit 145, thereby decoupling the auxiliary blanking pulse from the kinescope driver stages. The auxiliary blanking pulse would otherwise upset the quiescent operating condition of the kinescope drivers and therefore upset the color temperature adjustment of kinescope 38. The connection from pole 88a to auxiliary blanking unit 145 is not necessary in the absence of the auxiliary blanking pulse. The latter connection is the only AC signal coupling connection to switch 82, the remainder of the connections coupling DC signals. Noise pick-up, interference signals, and other problems such as capacitive loading, often associated with long connections coupling AC signals to a service switch, therefore are significantly reduced by the arrangement of FIGS. 1a and 1b.

Since video processing unit 12 is not disabled in the "service" mode, unit 12 continues to provide a composite video signal including luminance, chrominance and synchronization (sync) components. At this time, the chrominance and luminance components normally coupled via the chrominance and luminance channels are inhibited from reaching kinescope 38 as discussed. Also, horizontal oscillator 62 operates at a substantially constant desired horizontal line frequency (e.g., 15,734 Hz) in response to the frequency sychronizing sync component provided by sync separator 30, since this component is coupled to oscillator 62 independent of the position of switch 82.

The frequency of the oscillatory output signal of horizontal oscillator 62 is susceptible to slight variations (e.g., due to temperature changes or spurious signals such as noise) in the absence of the sync component (e.g., if the video IF stage of video processor 12 were disabled). Unregulated receiver operating voltages derived from horizontal flyback transformer 76 in response to the horizontal output signal coupled to transformer 76 would then undesirably vary in magnitude. Such receiver operating voltages can include the +210 volt operating voltage as shown, as well as an operating voltage associated with the screen grids of kinescope 38, for example.

The +210 volt operating voltage for kinescope driver stages 18a, 18b and 18c can, for example, be derived via a rectifier 79 and a filter capacitor 80 from a transformer secondary winding voltage waveform comprising periodic positive flyback pulses (e.g., 210 volts peak amplitude) coincident with horizontal retrace intervals.

In the absence of the sync component, variations of the frequency of the horizontal oscillator output signal cause corresponding variations in the timing of the positive pulse voltage waveform derived from the secondary winding of transformer 76. An increase or decrease of the horizontal oscillator signal frequency produces a corresponding decrease or increase in the duration of the signal trace interval relative to the retrace interval (the retrace interval remains substantially constant in this example). A corresponding increase or decrease in the positive 210 volt operating voltage therefore results, since the magnitude of the rectified and filtered average direct voltage provided by diode 79 and capacitor 80 is a function of the positive duty cycle of each retrace-trace period.

As a more specific example, when the frequency of the horizontal oscillator output signal decreases, the trace interval of the positive pulse voltage waveform increases relative to the retrace interval, so that the positive duty cycle and therefore the average positive DC level of the positive pulse voltage waveform decreases. A rectified positive DC voltage somewhat less than the desired 210 volts therefore results. A frequency variation of ±500 Hz can cause the desired +210 volt supply to vary 10–15 volts.

In essence, a desired level of unregulated operating voltages derived in this manner depends upon operation of horizontal oscillator 62 at the proper frequency. In this example, if horizontal oscillator 62 were not synchronized by the sync component during the service mode, the kinescope driver operating supply voltage (+210 volts) would change if the frequency of oscillation changed. Kinescope set-up adjustments performed under such condition would be inaccurate, since the kinescope driver operating supply voltage would revert to normal in the "normal" mode, when the operating frequency of oscillator 62 is properly established (synchronized) in response to the sync component.

Thus normal quiescent operating conditions of the receiver are closely simulated, and accurate kinescope set-up adjustments are facilitated, by maintaining horizontal oscillator 62 responsive to the sync component during the "service" mode in a system of the type described above.

Referring now to FIG. 2, there is shown a less complex, more economical service switch 282 including "normal" and "service" positions.

Switch 282 includes three poles 283, 285 and 287. Pole 283 is connected to the control input of vertical oscillator 72 (FIG. 1b), and pole 285 is connected to a source of negative direct voltage (−40 volts). Pole 287 is connected to the junction of resistors 92 and 93 (FIG. 1b) and also to a point in a voltage divider network including series coupled resistors 295, 296 and 297 connected between a source of positive direct voltage (+210 volts) and a source of negative direct voltage (−40 volts). The junction of resistors 296 and 297 is coupled to the control grids of kinescope 38.

In the "normal" position, the receiver and the brightness and color control circuits operate normally as mentioned previously. It is noted, however, that in the arrangement of FIG. 2 the brightness and color control circuits are biased with respect to the −40 volt source via poles 285 and 287 which are connected to the junction of resistors 92 and 93 in FIG. 1b. In comparison, it is noted that in the arrangement of FIG. 1b with service switch 82, the junction of resistors 92, 93 is coupled to ground potential in the "normal" position of service switch 82 via poles 84a and 86a. Accordingly, with the arrangement of FIG. 2, the values of resistors 92 and 93 should be selected so that brightness control 112 and color control 90 provide a desired amount of control in the normal operating mode.

Also in the normal mode, a first voltage appears at the junction of resistors 296 and 297 for biasing the control electrodes of kinescope 38. When service switch 282 is in the "service" position, the negative direct voltage source (−40 volts) is coupled from pole 285 via a negligible impedance and pole 283 to the control input of vertical oscillator 72 (FIG. 1b) to collapse the vertical scan as discussed previously. A kinescope control electrode bias voltage of increased magnitude then appears at the junction of resistors 296 and 297. This control grid bias voltage is in a direction to cause kinescope 38 to product (i.e., turn on) or to approach conduction. The kinescope is then adjusted by adjusting the voltages coupled to kinescope 38 by screen control unit 42 so that the separate guns are at a threshold level between conduction and cut-off. The bias voltage of the control grids is returned to the first bias voltage when service switch 282 is returned to the "normal" position.

Although the invention has been described in terms of specific embodiments, it should be recognized that other arrangements may be devised by those skilled in the art without departing from the scope of the invention.

What is claimed is:

1. In a color television receiver for processing a composite color video signal containing luminance, chrominance and synchronizing signal components, said receiver including a luminance channel for processing said luminance component; a chrominance channel for processing said chrominance component; a plurality of amplifier stages responsive to luminance and chrominance components processed by said luminance and chrominance channels; a color image reproducing device having a plurality of electron beam intensity control electrodes responsive to said luminance and chrominance components and direct current coupled to respective outputs of said amplifier stages; deflection means associated with said electron beam apparatus for providing horizontal and vertical scanning of said device, said deflection means including means for providing a periodic signal having time intervals representative of image trace and retrace intervals and a frequency synchronized by a synchronizing signal input thereto; means for deriving from said periodic signal a receiver operating supply voltage of a magnitude dependent upon the frequency of said periodic signal; and means for applying said supply voltage to said amplifier stages and thereby applying a proportional voltage at said direct coupled intensity control electrodes; control apparatus comprising:
 switching means coupled to a direct voltage control terminal of each of said luminance and chrominance channels and said deflection means via a direct current connection for providing selective direct current control of said luminance and chrominance channels and said deflection means, said switching means having
  a first position for selectively rendering said luminance and chrominance channels and said deflection means normally operative in a normal mode of operation of said receiver; and
  a second position for selectively rendering said luminance and chrominance channels inoperative to couple said luminance and chrominance components, and for rendering said deflection means inoperative to provide scanning of said device in one direction, to permit adjustment of said device in a service mode of operation of said receiver;
 means responsive to said composite color video signal and operative independent of said luminance and chrominance channels for separating said synchronizing signal component; and
 means coupled to said separating means for supplying the separated synchronizing signal component to said periodic signal providing means as said synchronizing signal input independent of the position of said switching means, whereby said derived receiver operating supply voltage and said proportional voltage applied to said intensity control electrodes exhibit substantially the same respective magnitudes during both said normal and service modes independent of the position of said switching means.

2. Apparatus according to claim 1, wherein said deflection means comprises:
 vertical deflection means responsive to said separated synchronizing component for providing periodic vertical deflection scanning signals for said device; and
 horizontal deflection means responsive to said separated synchronizing component for providing said periodic signal, said periodic signal being a horizontal image scanning signal having time intervals representative of horizontal image trace and retrace intervals.

3. Apparatus according to claim 2, wherein:
 said first position is arranged to develop a direct voltage at said respective direct voltage control terminals of said luminance and chrominance channels; and
 said second position is arranged to develop a modified direct voltage at said respective direct voltage control terminals of said luminance and chrominance channels to render said channels inoperative to couple said luminance and chrominance components, and to develop a direct voltage at said direct voltage control terminal of said vertical deflection means to inhibit operation of said vertical deflection means and thereby vertical scanning of said image reproducing device.

4. Apparatus according to claim 2, and further comprising:
 color control means having a direct voltage input terminal coupled to said switching means and an output terminal coupled to said chrominance channel, for controlling the gain of said chrominance channel and thereby the amplitude of said chrominance component;
 brightness control means having a direct voltage input terminal coupled to said switching means and an output terminal coupled to said luminance channel, for controlling the DC content of said luminance component;
 said first position of said switching means being arranged to develop a direct voltage at each of said input terminals of said color control means and said brightness control means; and
 said second position of said switching means being arranged to develop a modified direct voltage at each of said input terminals of said color control means and said brightness control means, to inhibit said chrominance and luminance components by rendering said chrominance and luminance channels inoperative to couple said chrominance and luminance components.

5. In a color television receiver for processing a composite color video signal containing luminance, chrominance and synchronizing signal components, said receiver including a luminance channel for processing said luminance component; a chrominance channel for processing said chrominance component; a color image reproducing device having plural electron beam apparatus responsive to luminance and chrominance components coupled via said luminance and chrominance channels; vertical deflection means associated with said electron beam apparatus for providing a periodic vertical deflection scanning signal for said device; horizontal deflection means associated with said electron beam apparatus for providing a periodic horizontal deflection scanning signal having time intervals representative of horizontal image trace and retrace intervals and a frequency synchronized by a synchronizing signal input thereto; and means for deriving from said periodic horizontal deflection signal a receiver operating supply voltage of a magnitude dependent upon the frequency of said horizontal deflection signal; control apparatus comprising:
 color control means and brightness control means each comprising an adjustable resistance device, said color control means having a direct voltage input terminal and an output terminal coupled to a direct voltage control terminal of said chrominance channel for controlling the gain of said chrominance channel and thereby the amplitude of said chrominance component, said brightness control means having a direct voltage input terminal and an output terminal coupled to a direct voltage control terminal of said luminance channel for controlling the D.C. content of said luminance component;

switching means coupled to said direct voltage input terminals of said color control means and said brightness control means, and to a direct voltage control terminal of said vertical deflection means, said switching means having a first position being arranged to develop a direct voltage at each of said input terminals of said adjustable resistance devices, for rendering said luminance and chrominance channels and said vertical deflection means normally operative in a normal mode of operation of said receiver; and a second position being arranged to provide a modified direct voltage at each of said input terminals of and thereby across each said adjustable resistance device, to inhibit said luminance and chrominance components by rendering said luminance and chrominance channels inoperative to couple said luminance and chrominance components, and for rendering said vertical deflection means inoperative to provide vertical scanning of said image device, to permit adjustment of said image device in a service mode of operation of said receiver;

means responsive to said composite color video signal and operative independent of said luminance and chrominance channels for separating said synchronizing signal component, said vertical and horizontal deflection means being responsive to said separated synchronizing component for providing said vertical and horizontal deflection signals, respectively; and means coupled to said separating means for supplying the separated synchronizing signal component to said horizontal deflection means as said synchronizing signal input independent of the position of said switching means, whereby said derived receiver operating supply voltage exhibits substantially the same magnitude during both said normal and service modes.

6. Apparatus according to claim 4, and further comprising:

blanking level clamping means included in said luminance channel and coupled to said output of said brightness control means, for clamping the luminance signal to a level corresponding to a black tone of a reproduced image to a reference voltage, said reference voltage being proportional to a direct voltage provided by said brightness control means in said first position and to a modified direct voltage in said second position, said modified direct voltage being in a direction corresponding to said black tone.

7. In a color television receiver for processing a composite color video signal containing luminance, chrominance and synchronizing signal components, said receiver including a luminance channel for processing said luminance component; a chrominance channel for processing said chrominance component; a color image reproducing device having plural electron beam apparatus responsive to luminance and chrominance components coupled via said luminance and chrominance channels; vertical deflection means associated with said electron beam apparatus for providing a periodic vertical deflection scanning signal for said device; horizontal deflection means associated with said electron beam apparatus for providing a periodic horizontal deflection scanning signal having time intervals representative of horizontal image trace and retrace intervals and a frequency synchronized by a synchronizing signal input thereto; and means for deriving from said periodic horizontal deflection signal a receiver operating supply voltage of a magnitude dependent upon the frequency of said horizontal deflection signal; control apparatus comprising:

color control means having a direct voltage input terminal and an output terminal coupled to a direct voltage control terminal of said chrominance channel for controlling the gain of said chrominance channel and thereby the amplitude of said chrominance component;

brightness control means having a direct voltage input terminal and an output terminal coupled to a direct voltage control terminal of said luminance channel for controlling the D.C. content of said luminance component;

switching means coupled to said direct voltage input terminals of said color control means and said brightness control means, and to a direct voltage control terminal of said vertical deflection means, said switching means having a first position being arranged to develop a direct voltage at each of said input terminals of said color control means and brightness control means, for rendering said luminance and chrominance channels and said vertical deflection means normally operative in a normal mode of operation of said receiver; and a second position being arranged to develop a modified direct voltage at each of said input terminals of said color control means and said brightness control means, to inhibit said luminance and chrominance components by rendering said luminance and chrominance channels inoperative to couple said luminance and chrominance components, and for rendering said vertical deflection means inoperative to provide vertical scanning of said image device, to permit adjustment of said image device in a serivce mode of operation of said receiver;

blanking level clamping means included in said luminance channel and coupled to said output of said brightness control means, for clamping the luminance signal level corresponding to a black tone of a reproduced image to a reference voltage, said reference voltage being proportional to a direct voltage provided by said brightness control means in said first position and to a modified direct voltage in said second position, said modified direct voltage being in a direction corresponding to said black tone;

means included in said luminance channel for normally coupling clamped luminance signals to said image reproducing device, said coupling means being rendered inoperative for coupling said luminance signals in response to said modified direct voltage in said second position;

means responsive to said composite color video signal and operative independent of said luminance and chrominance channels for separating said synchronizing signal component, said vertical and horizontal deflection means being responsive to said separated synchronizing component for providing said vertical and horizontal deflection signals, respectively; and means coupled to said separating means for supplying the separated synchronizing signal component to said horizontal deflection means as said synchronizing signal input independent of the position of said switching means, whereby said derived receiver operating supply voltage exhibits substantially the same magnitude during both said normal and service modes.

8. Apparatus according to claim 7, wherein:

an auxiliary blanking circuit having an input coupled to an output of said horizontal deflection means and having an output coupled to said image reproducing device at a point after said coupling means, for normally rendering said plural color producing beam apparatus inoperative to produce a trace image during a period in which said image reproducing device is being vertically retraced and horizontally traced; and wherein said switching means is coupled to said auxiliary blanking circuit, said auxiliary blanking circuit being rendered inoperative in said second position.

9. Apparatus according to claim 7, comprising:

a first transistor of a first conductivity type having a base for receiving clamped luminance signals and a collector coupled to a first source of supply voltage; and a second transistor of opposite conductivity type to that of said first transistor, having an emitter direct coupled to an emitter of said first transistor, a base for receiving said chrominance component, and a collector direct current coupled to said image reproducing device and through an impedance to a second source of supply voltage corresponding to said derived receiver operating supply voltage.

10. Apparatus according to claim 8, comprising:

a first transistor of a first conductivity type having a base for receiving clamped luminance signals and a collector coupled to a first source of supply voltage;

a second transistor of opposite conductivity type to that of said first transistor, having an emitter direct coupled to an emitter of said first transistor, a base for receiving said chrominance component, and a collector direct current coupled to said image reproducing device and through an impedance to a second source of supply voltage corresponding to said derived receiver operating supply voltage; and wherein said auxiliary blanking circuit is coupled to said emitter of said first transistor.

11. Apparatus according to claim 1, and further comprising:

means for coupling said switching means to control electrodes of said image reproducing device to develop a direct voltage at said control electrodes in said first position, and to develop a modified direct voltage at said control electrodes in said second position to permit adjustment of said image reproducing device.

12. In a color television receiver for processing a composite color video signal containing luminance, chrominance and synchronizing signal components, said receiver including a luminance channel for processing said luminance component; a chrominance channel for processing said chrominance component; a color image reproducing device having plural electron beam apparatus responsive to luminance and chrominance components coupled via said luminance and chrominance channels; deflection means associated with said electron beam apparatus for providing horiziontal and vertical scanning of said device, said deflection means including means for providing a periodic signal having time intervals representative of image trace and retrace intervals and a frequency synchronized by a synchronizing signal input thereto; and means for deriving from said periodic signal a receiver operating supply voltage of a magnitude dependent upon the frequency of said periodic signal; control apparatus comprising:

switching means coupled to a direct voltage control terminal of each of said luminance and chrominance channels and said deflection means, said switching means having a first position for selectively rendering said luminance and chrominance channels and said deflection means normally operative in a normal mode of operation of said receiver; and a second position for selectively rendering said luminance and chrominance channels inoperative to couple said luminance and chrominance components, and for rendering said deflection means inoperative to provide scanning of said device in one direction, to permit adjustment of said device in a service mode of operation of said receiver;

means responsive to said composite color video signal and operative independent of said luminance and chrominance channels for separating said synchronizing signal comonent;

a voltage divider network coupled between first and second source of direct voltage, for coupling said switching means to control electrodes of said image reproducing device to develop a direct voltage at said control electrodes in said first position, and to develop a modified direct voltage at said control electrodes in said second position to permit adjustment of said image reproducing device, said switching means being coupled to an intermediate point of said voltage divider; and means coupled to said separating means for supplying the separated synchronizing signal component to said periodic signal providing means as said synchronizing signal input independent of the position of said switching means, whereby said derived receiver operating supply voltage exhibits substantially the same magnitude during both said normal and service modes.

* * * * *